United States Patent
Biddiscombe et al.

(10) Patent No.: US 7,333,827 B2
(45) Date of Patent: Feb. 19, 2008

(54) RESTRICTED DISSEMINATION OF TOPOLOGY INFORMATION IN A COMMUNICATION NETWORK

(75) Inventors: Martin Biddiscombe, Harlow (GB); Subramaniam Sabesan, Bishops Stortford (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 416 days.

(21) Appl. No.: 10/975,066

(22) Filed: Oct. 13, 2004

(65) Prior Publication Data

US 2005/0276251 A1 Dec. 15, 2005

(30) Foreign Application Priority Data

Jun. 9, 2004 (GB) .................................. 0412846.8

(51) Int. Cl.
*H04B 7/00* (2006.01)
(52) U.S. Cl. ...................... 455/519; 370/237; 370/238; 370/351; 709/239; 709/240; 709/241; 709/242
(58) Field of Classification Search ................ 370/229, 370/231, 235, 351, 355, 356, 237–238, 254, 370/400; 455/519; 709/238–242
See application file for complete search history.

(56) References Cited

U.S. PATENT DOCUMENTS

2004/0174825 A1* 9/2004 Li et al. ..................... 370/254

OTHER PUBLICATIONS

U.S. Appl. No. 10/757,139, filed Jan. 14, 2004, Ashwood Smith.

* cited by examiner

*Primary Examiner*—Edward F. Urban
*Assistant Examiner*—Raymond S. Dean
(74) *Attorney, Agent, or Firm*—Barnes & Thornburg LLP

(57) ABSTRACT

A communication network comprises a plurality of nodes which exchange topology information. Some of the nodes are of a conventional type, which propagate topology information in an unrestricted manner while others of the nodes are of a radius-restricted type, which propagate topology information for a restricted distance within the network. Upon receiving a topology advertisement from another node, a node determines what type of node sent the advertisement, and adjusts its operation accordingly. A radius-restricted node forwards a topology advertisement with a metric which indicates the aggregate distance travelled by that advertisement. When a radius-restricted node receives a topology advertisement from a non radius-restricted node, it forwards the topology advertisement with a metric set at a value which will prevent other radius-restricted nodes from installing the topology advertisement. This prevents flooding of unnecessary information.

22 Claims, 7 Drawing Sheets

| LS Age | Options | LS type |
|---|---|---|
| Link State ID ||| 
| Advertising Router ||| 
| LS Sequence number ||| 
| LS Checksum || length |

Fig. 3

| LS Age | Options | LS type |
|---|---|---|
| Link State ID ||| 
| Advertising Router ||| 
| LS Sequence number ||| 
| LS Checksum || length |
| Aggregate metric ~ 180 |||

Fig. 4

RESTRICTED DISSEMINATION OF TOPOLOGY INFORMATION IN A COMMUNICATION NETWORK

FIELD OF THE INVENTION

This invention relates to the dissemination of topology information in communication networks.

BACKGROUND TO THE INVENTION

Communication networks comprise a large number of interconnected network nodes, such as terminals, routers and switches. Data is communicated through such a network by passing protocol data units, such as Internet Protocol (IP) packets, Ethernet frames or data cells between nodes. A particular protocol data unit may travel along a path through many such nodes and communication links and a network of this kind should efficiently route the protocol data units between nodes.

In-order to route packets, the network topology needs to be known by all nodes in the network. Network topology information, which can be used to route data units, can be exchanged between nodes using a variety of protocols. With link state routing protocols each router advertises information about links to which it is connected and update messages known as Link State Advertisements (LSAs) are sent between routers. Link State routers maintain topology databases containing representations of every link and router in the network and a state for each element. One link state protocol is Open Shortest Path First (OSPF), which is described in RFC2328. Routing protocols such as OSPF work well in small networks but they are less suited to larger networks, and networks where the topology changes frequently. One situation where the network topology can frequently change is in wireless ad-hoc networks. The topology may change quite often, and even if nodes are not being added, removed or moved transient radio interference will cause links between nodes to vary in both their capacity and their availability. The cost, in terms of bandwidth, of updating each node's view of the network topology is high. If the number of network nodes is large or the topology is changing, for example due to wireless links forming and breaking as radio reception quality varies, the number of updates required will be large, resulting in significant bandwidth consumption by the routing protocol.

One known way of coping with this problem is to divide OSPF routers into areas. Routers within each area are configured with information about other routers within their own area. Special routers, known as border routers, interwork between areas. While this scheme can reduce the number of LSAs that are sent between nodes this kind of sub-division requires a centralized management function. This requirement does not lend itself to ad-hoc networks, where it is desirable that nodes should not require centralized management or configuration.

A U.S. patent application with U.S. Ser. No. 10/757,139, filed 14 Jan. 2004, the contents of which are incorporated herein by reference, describes how link state advertisement messages are propagated a limited distance from their source. This creates the notion of a routing radius, which is defined for each node and includes the nodes whose distance is no more than some predefined limit. With this enhancement to OSPF, each node will only know the topology of the network within its routing radius and nodes are updated about topological changes only within that radius. Thus, even though a network can be arbitrarily large, the updates are only propagated relatively locally.

While this enhancement can improve the performance of networks, it can cause problems in situations where the network comprises a mix of conventional OSPF routers and routers which operate with the radius-restricted enhancement.

The present invention seeks to improve the operation of a network in which a mix of router types are present.

SUMMARY OF THE INVENTION

A first aspect of the present invention provides a method of operating a node within a communication network, the network comprising a plurality of nodes interconnected by communication links, the method comprising:

receiving a topology advertisement from another node of the network which provides information about a part of the network;

determining if the topology advertisement was sent by a node which supports radius-restricted dissemination of topology information;

selecting a mode of operation to interwork with said another node dependent on the determination, the node being operable in:

a radius-restricted mode, in which the node includes a metric indicative of the aggregate path travelled by a topology advertisement when interacting with said another node; or a non radius-restricted mode, in which the node does not include a metric indicative of the aggregate path travelled by a topology advertisement when interacting with said another node.

In this manner, a network which is a mix of types of node can operate correctly, allowing nodes to exchange topology information and to create a full database of topology information.

A further aspect of the invention provides a method of operating a node within a communication network, the network comprising a plurality of nodes interconnected by communication links, the nodes being of a radius-restricted type, which propagate topology information for a restricted distance within the network, and of a non radius-restricted type, which do not restrict the propagation of topology information, the method comprising:

receiving a topology advertisement from a non radius-restricted node which provides information about a part of the network;

forwarding the topology advertisement to a radius-restricted node with a metric indicative of the aggregate path travelled by the topology advertisement, the metric being set at a value which will prevent that node from installing the topology advertisement.

This has the effect of 'poisoning' topology information which is received from non radius-restricted nodes and prevents a part of the network which comprises radius-restricted nodes from being overloaded by topology information that is likely to be irrelevant to them. Preferably, the method further comprises performing a calculation to determine an actual path length between the node and a node which originated a received topology advertisement. The calculated path is compared with a radius threshold and, if the calculated shortest path is less than the threshold, the topology advertisement is forwarded to the radius-restricted node. Thus, only topology information which is relevant to a radius-restricted node is forwarded.

Further aspects of the invention relate to a node including control logic which is operable to perform any of the steps of these methods and a network incorporating such a node.

Although in this application a wireless-based network will be described, and the nodes will be discussed as communicating with each other and with end users using various wireless protocols, the invention is not limited in this regard. Rather, the invention may be used more broadly with other types of communication technology, such as wireline, infra red, acoustic, and numerous other types of communication technology.

The functionality described here can be implemented in software, hardware or a combination of these. The invention can be implemented by means of hardware comprising several distinct elements, and by means of a suitably programmed computer. Accordingly, another aspect of the invention provides software for performing any of the steps of these methods. It will be appreciated that software may be installed on the node at any point during the life of the equipment. The software may be stored on an electronic memory device, hard disk, optical disk or other machine-readable storage medium. The software may be delivered as a computer program product on a machine-readable carrier or it may be downloaded directly to the node via a network connection.

In the following description embodiments are described with reference to the link state protocol Open Shortest Path First (OSPF). However, the invention is not limited to OSPF and is applicable to other routing protocols such as Intermediate System to Intermediate System (IS-IS). The term 'topology advertisement' is to be construed as a message which provides information about the topology of a part of the network, and can include information about the existence and/or state of a link within a network. In a preferred embodiment, the topology advertisement is a link state advertisement such as the Link State Advertisement (LSA) used in OSPF.

BRIEF DESCRIPTION OF THE DRAWINGS

Embodiments of the invention will be described with reference to the accompanying drawings in which:

FIG. 3 shows a conventional LSA header;

FIG. 4 shows a modified LSA header carrying an aggregate metric;

DESCRIPTION OF PREFERRED EMBODIMENTS

Figure 1:
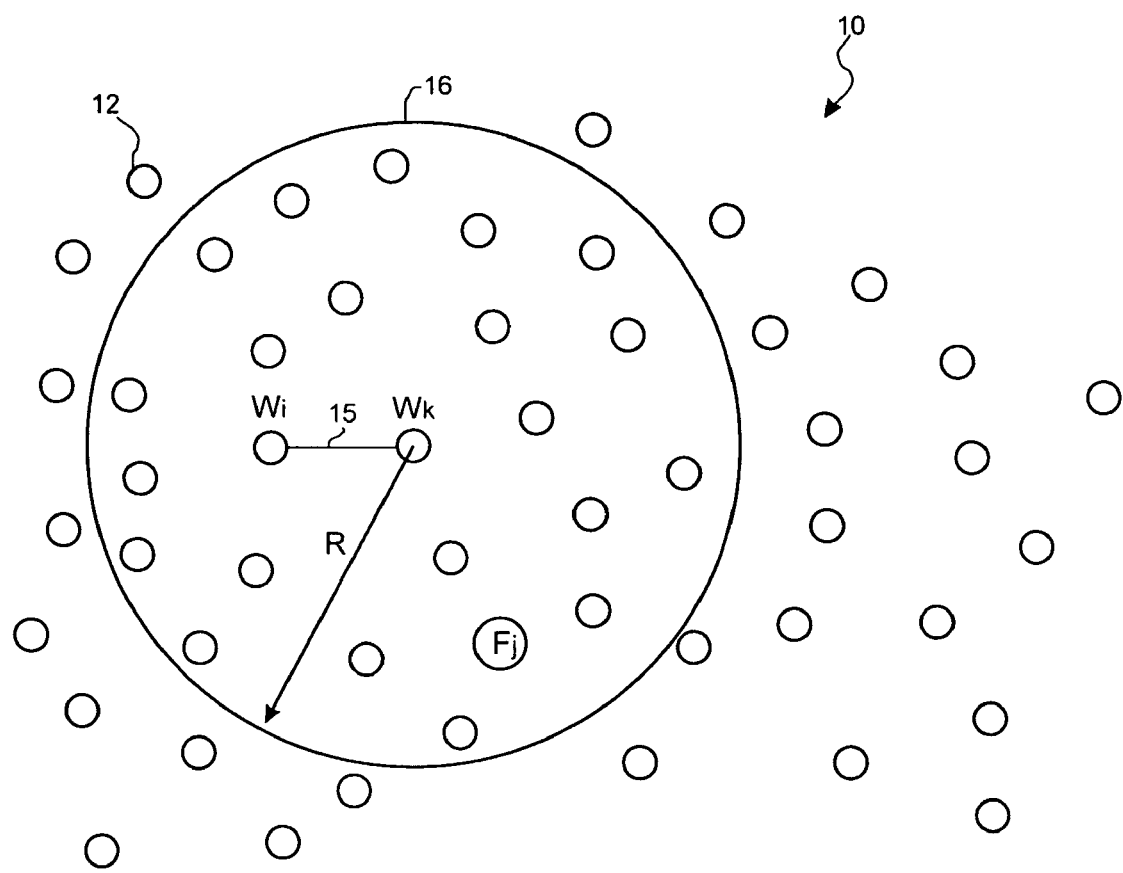
FIG. 1 shows a communications network in which link state advertisements are forwarded for a restricted distance.

FIG. 1 illustrates an example of a communication network 10 in which the invention can be applied. A plurality of nodes 12 are shown distributed across an area. Neighbouring nodes are interconnected by communication links to form an interconnected mesh topology. For clarity, only one such link 15 is shown between a pair of nodes Wi, Wk. In accordance with the standard features of the OSPF protocol (RFC 2328) the details of link 15 will be advertised in a Link State Advertisement (LSA) message to all others nodes in the network 10, which results in a significant volume of LSA messages. When a LSA is created at a node, it is broadcasted on all of the interfaces (to links) at that node. When a node receives a LSA, it processes the LSA and floods it to all of the neighbouring nodes other than the neighbouring node from which the LSA was received. These updates are generated at regular intervals to prevent the network information from becoming 'stale' and timing out. LSAs can be transmitted in response to a node detecting a change in the state of a link. The forwarding process results, over a period of time, in all nodes 12 within the network 10 being informed of a link, or of a change to a link. Once an LSA reaches its maximum age, and if a more recent update has not been received, the nodes holding that LSA in their database are required to delete it and no longer use it for routing purposes.

A further updating process is known as synchronisation. Each router maintains a database description of the network topology and each router has an identical topology database. The database is a particular router's local state and the router shares its local state with the rest of the network. OSPF routers keep their topology databases synchronised by exchanging information is through database synchronisation at node start-up. During this process, each of the new node's neighbours updates it with the latest topology information they have.

Figure 2:
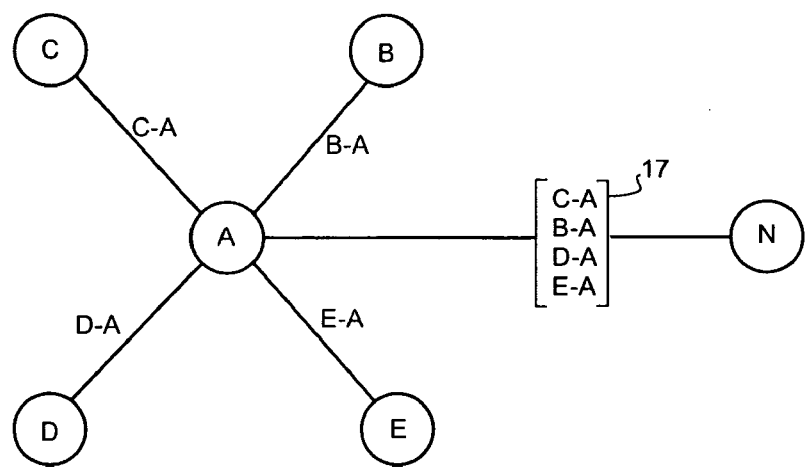
FIG. 2 shows how a node advertises links to other nodes.

FIG. 2 shows a very simplified set of nodes. Node A is connected to neighbouring nodes B, C, D, E by respective links. Node A originates a link state advertisement 17 which contains information about links B-A, C-A, D-A, and E-A.

In accordance with an embodiment of the invention, the propagation of LSAs during flooding and synchronisation is bounded without requiring distinct OSPF areas to be defined. As shown in FIG. 1, advertisement of the link 15 between nodes Wi and Wk will propagate a particular distance R on the network and then not propagate any further. The total propagation area for the LSA associated with link 15 is shown by the circle 16. Referring again to FIG. 2, the LSA 17 is forwarded by several nodes and arrives at a distant node N. Node N will need to determine if the LSA should continue to be advertised on the network or dropped, and whether the information contained in the LSA should be included in its routing tables. This decision is required for both LSA flooding and database synchronization in OSPF. By limiting the distance a Link State Advertisement (LSA) will propagate on the network it is possible to limit LSA traffic on the network without defining 'hard' areas on the network. Not having areas on the network eliminates the need to name those areas and designate nodes as belonging to particular areas. This enables new nodes to be added to the network on an ad-hoc basis without a centralized management structure. Additionally, this enables the nodes to be mobile on the network without requiring close monitoring and updating of area affiliation by the nodes. Further, not having areas on the network eliminates the requirement for area border routers to control link state advertisements, reduces or eliminates special intra-area communication protocol exchanges, and avoids potential congestion which may occur in connection with inter-area traffic.

In order to limit the propagation of LSAs beyond the radius limit, when an LSA arrives at a router—either as part of the database synchronisation phase, or during update flooding—the router must decide whether or not to install the LSA, and therefore also whether or not to propagate the LSA further, based on the distance to the LSA's point of origin. Conventional OSPF (RFC2328) does not provide any indication of how far an LSA has travelled. Also, a node does not know explicitly (except at steady state, when it is able to look up the originating node in its routing table) how far away the source of such a PDU is from itself. Therefore, in order to restrict the flooding, a method of determining the distance of the origin of a PDU has to be introduced. This could be achieved in various ways. Two possible ways are:

1. Carry a metric within the LSA (either within the header or body of the LSA) and update this metric as the LSA passes through nodes. The metric is representative of the aggregate cost of the path travelled by that LSA. The cost can be expressed in terms of distance, resources or another quantity. The metric is incremented by a node as the LSA propagates through the network. Each node maintains a threshold value for the metric. LSAs which carry a metric which falls below the threshold value are propagated to other nodes, while LSAs which carry a metric which is above the threshold value fall are not propagated any further.

2. Delay the forwarding (flooding) of incoming LSAs until the router knows the distance to the source. This requires the router to wait until shortest path first (SPF) have been made which, in turn, requires the router to have received LSAs from all other nodes. This will cause significant delay and computational overhead. In addition, during the initial database synchronisation phase when an OSPF router comes online and learns the network topology from its neighbours, the order it receives LSAs is nearly always unrelated to the network topology. It is entirely possible that the router may receive many LSAs (possibly dozens or hundreds) before it is able to build a shortest path first tree with itself as the root. The reason for this is that it may not receive the LSAs describing its immediate neighbours, or their neighbours until late on in the synchronisation process.

In view of the above, it is preferred to carry the aggregate cost metric within the LSA. The aggregate metric can be carried within the header of a LSA or within the body of the LSA. FIG. 3 shows a standard OSPF header and FIG. 4 shows a modified OSPF header with a new field 180 appended. There is a significant benefit in carrying the extra information within the header because during database synchronisation only the headers are exchanged between neighbouring routers to determine the missing topology information at each router. If the radius information is readily available within the header then this will reduce the complexity of introducing the radius restriction at synchronisation. However, as there are no spare bits within a LSA header the extra field 180 must be added to the header to carry the aggregate metric information. A 4 byte wide field (32 bit unsigned integer) can carry the aggregate metric. Changing the size of the LSA header would require changes to OSPF apparatus to accommodate the exchange of this extra information.

Figure 5:
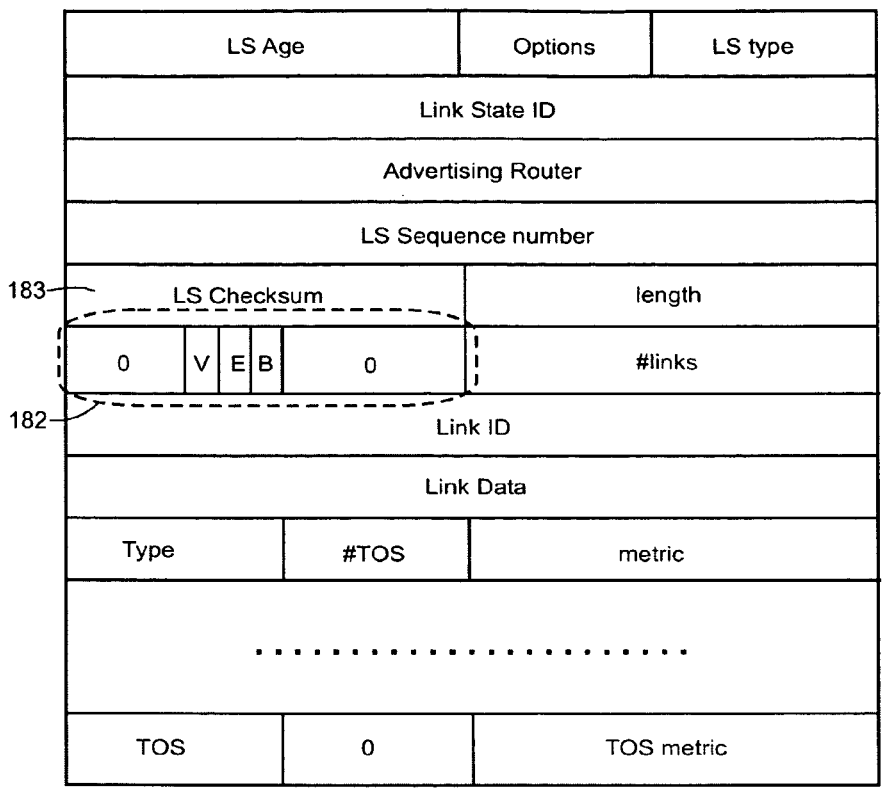
FIG. 5 shows a conventional LSA message.

It is possible to carry the aggregate metric in the body of router LSAs (i.e. Type 1 LSAs), since there are some unused bits available. FIG. 5 shows a standard OSPF (Type 1) LSA. At the start of the body there are 2 bytes allocated as "flags field" 182 and only 3 bits (V,E,B bits) are used. As shown in the modified LSA of FIG. 6, the remaining 13 unused bits of the modified flags field 184 are used to carry the aggregate metric. Doing so has no impact on the length of the LSA and hence the enhancements required to incorporate these changes should not impact the majority of existing LSA handling procedures.

Figure 7:
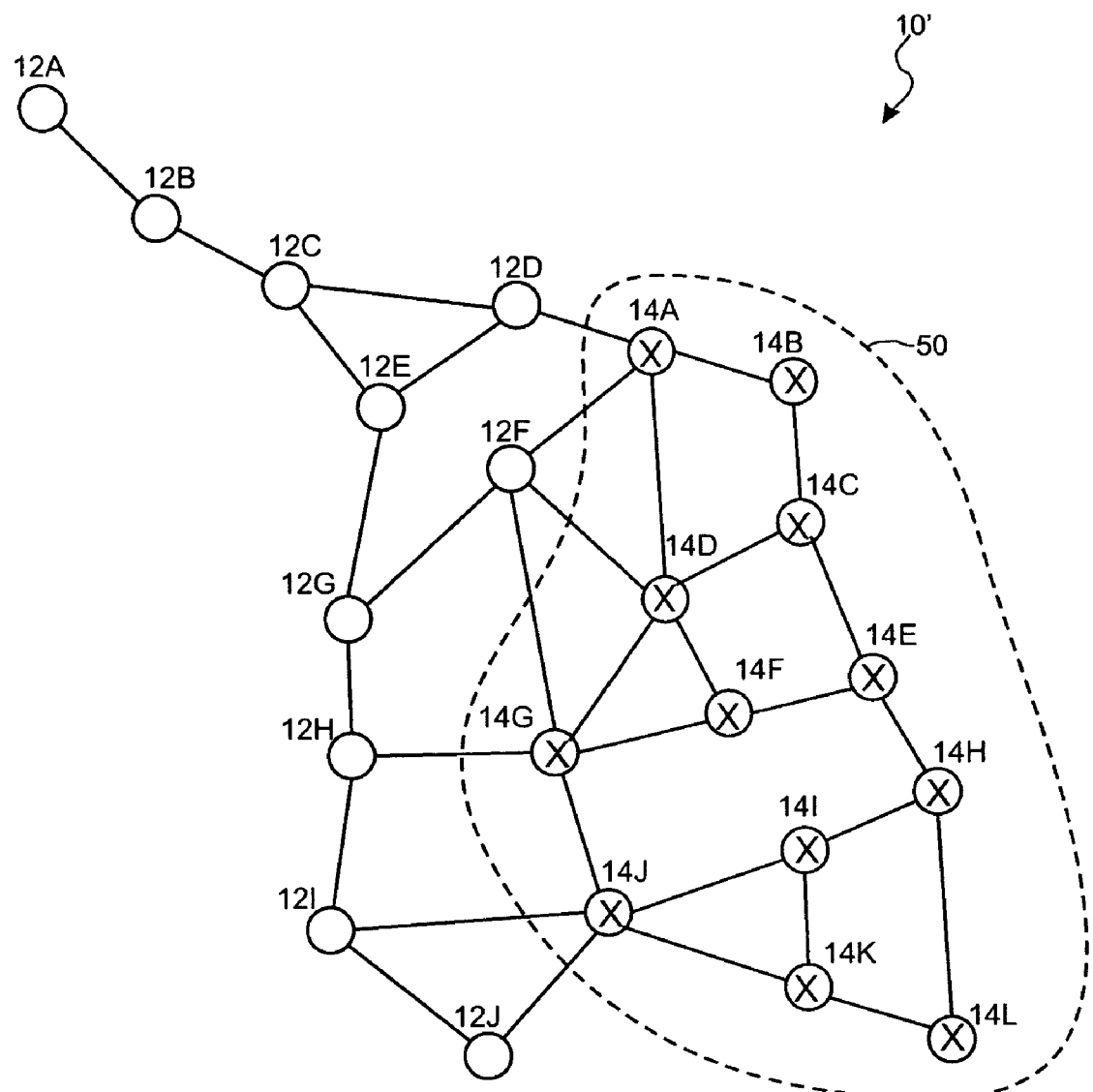
FIG. 7 shows an example network topology with a mix of conventional and radius-restricted routers.

FIG. 7 shows a network 10' in which there are two types of routers. Routers 14A-14L are radius-restricted routers which operate in the manner just described, sending and receiving LSAs which include a metric indicative of the aggregate distance travelled by the LSA and selectively forwarding LSAs only if the metric is within a threshold (radius) limit. Routers 12A-12J are conventional routers which do not support the radius-restricted enhancements. Routers 14A, 14D, 14G, 14J are required to interwork with conventional routers. Considering router 14A, this connects to radius-restricted routers 14B and 14D and also to conventional routers 12D, 12F. As routers 12D and 12F are conventional, they will not understand the metric and may simply ignore any messages received from routers 14A. If this occurs, routers 12D, 12F will fail to receive topology information about the network from router 14A and thus will not operate correctly. In accordance with an embodiment of the invention, router 14A determines whether the router sending a LSA supports the radius-restricted features and adapts it's mode of operation accordingly. Three possible ways for detecting the type of router will now be described.

In a first method it is assumed that the aggregate metric is encoded in LSA headers (as shown in FIG. 4). A radius-restricted router (such as router 14A) upon receiving a LSA (e.g. from router 12D) checks the length of the LSA message. Assuming that the neighbour is only using a single Type of Service metric (TOS #0), the formula for the LSA length will be either (24+12*n) bytes for conventional OSPF, or (28+12*n) bytes, for radius-restricted OSPF, where n is the number of links advertised in the LSA. It is noted that Type of Service metric (TOS #0) operation is normal and other modes of operation are rare. LSAs with a metric encoded in this way are 4 bytes longer than conventional LSAs. If the router receives a LSA of the shorter length, without a metric, from its neighbour it deduces that that neighbour does not understand radius restriction and proceeds in a mode of operation where it sends LSAs of a conventional format to that router.

Figure 6:
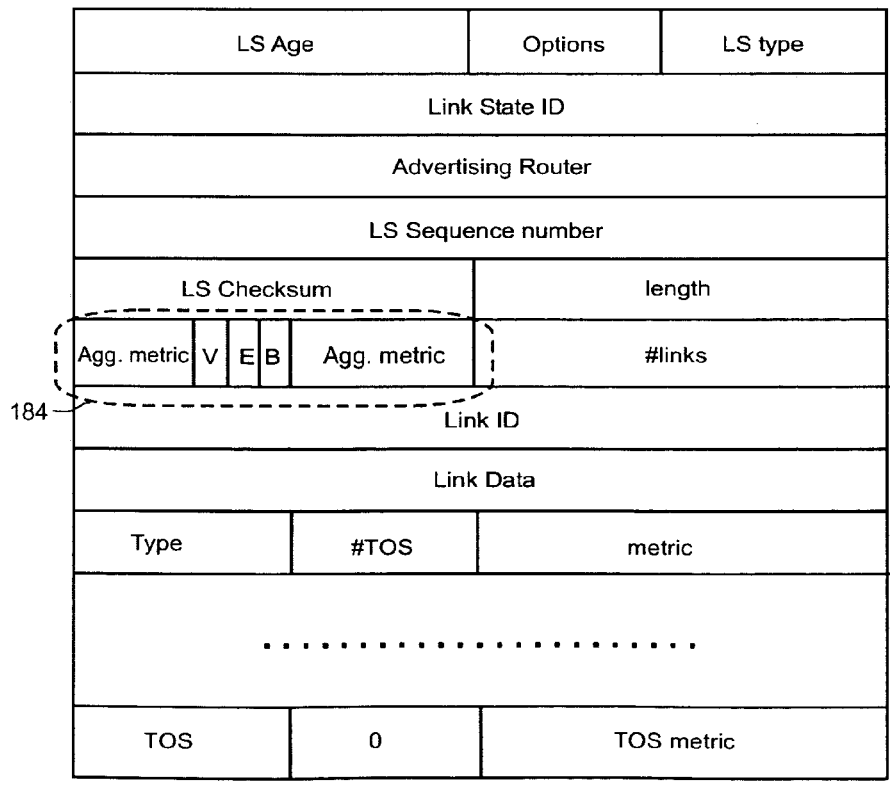
FIG. 6 shows a modified LSA message carrying an aggregate metric.

In a second method, it is assumed that the aggregate metric is encoded in the body of the LSA message as shown in FIG. 6. It will be recalled that conventionally field 182 (FIG. 5) is set to all zeros, but for radius-restricted routing the field (184, FIG. 6) will contain the aggregate metric. When a LSA originates from a node, that node sets the metric to an initial value of zero and subsequent nodes that forward the LSA increment the metric. When a radius-restricted router receives a LSA it checks the metric field. If the value of the metric field is zero, it compares the origin of the LSA with the neighbour it has received that LSA from. If the router LSA did not originate at that neighbour (i.e. the neighbour was simply forwarding the LSA from another node) it knows that the aggregate metric should be non-zero. The router deduces that the neighbour it received the LSA from does not understand radius restriction and proceeds in a mode of operation where it sends LSAs of a conventional format to that router.

In a third, preferred method, all radius-restricted routers perform a different checksum algorithm to that used by conventional routers. Conventionally, a router receives a LSA and performs a checksum calculation using a known checksum algorithm. The result of the checksum is compared to a checksum value carried within the LSA, shown as field 183 in FIG. 5. In accordance with this enhancement, a modified checksum algorithm is used which, given the same set of input data, will yield a different result from that given by the conventional checksum algorithm. As an example, a simple operation could be performed on the output of the conventional checksum calculation such as 'add 1' or a bitwise inversion. Upon receiving a LSA the router performs the modified checksum algorithm on the contents of the LSA header and compares this to the checksum field within the LSA. If the calculated checksum is different to that carried within the checksum field 183 of the LSA then this indicates that the LSA is either from a conventional router or an error has occurred during transmission of the message. To be certain that the LSA was sent by a conventional router, the router performs a checksum calculation using the conventional checksum algorithm. If the result is correct, the router deduces that the neighbour it received the LSA from does not understand radius restriction and proceeds in a mode of operation where it sends LSAs of a conventional format to that router. If the result of calculating the second (conventional) checksum is failure, then the router concludes that an error really has occurred and behaves accordingly.

Figure 8:
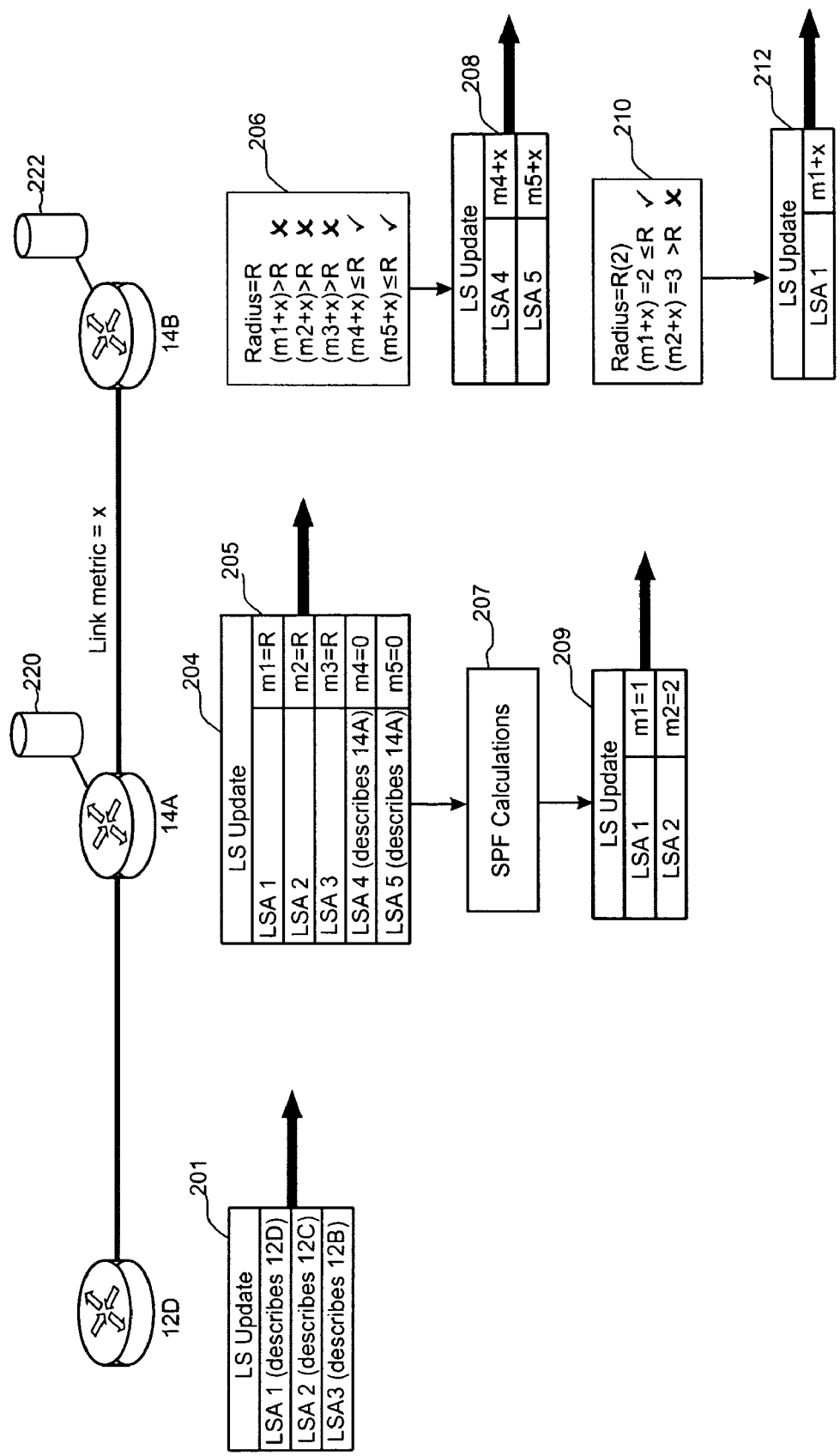
FIG. 8 shows the process of interworking between routers.

Once a radius-restricted router has learned that a neighbouring router is of a conventional type (e.g. in FIG. 7 router 14A learns that router 12D is conventional) there is a further problem of preventing LSAs from the conventional routers from leaking further than necessary into the radius-restricted domain. Because conventional routers do not support any indication of the distance travelled by a LSA, the LSAs arriving at the 'border' routers (e.g. routers 14A, 14D, 14G, 14J in FIG. 7) may have travelled some considerable distance. If the border routers were to forward all LSAs they received, this would flood the radius-restricted portion 50 of the network and reduce any benefit of performing radius-restriction. FIG. 8 shows a worked example of how LSAs received at a border router are processed.

Router 14A receives a LS Update message 201 from neighbouring router 12D. By one of the processes described above, router 14A determines that router 12D is a conventional router which does not support radius-restriction. LS Update message 201 includes an LSA originated by router 12D (e.g. giving details of the link between 12D and 12E) as well as LSAs which originated at routers 12B and 12C that router 12D is forwarding. When router 14A receives the update message 201, it adds a metric 205 to each LSA. This is set at the threshold (radius) value of R. This allows router 14A to install the LSAs but will ensure that other radius-restricted routers downstream of router 14A will not install them. Router 14A then prepares it's own LS Update message 204 which includes the LSA1, LSA2, LSA3 (originating at routers 12B, 12C, 12D) as well as LSA4, LSA5 which describe the links at router 14A. Update message 204 is forwarded to neighbouring node 14B. Upon receiving the update message 204, router 14B performs a calculation to determine whether each of the LSAs should be installed. Each metric in the received LSA is incremented by the most recent link metric value (x). Node 14B compares, for each LSA within the update 204, the newly incremented aggregate metric value associated with that LSA with the threshold metric value representing the maximum propagation radius. Depending on the comparison, node 14B acts as follows:

a. If the aggregate metric is less than or equal to its threshold value then it accepts the LSA and then the normal LSA handling procedures are followed as standard, including installation of the LSA in it's local database 222, advertising of the LSA during database synchronisation and onward flooding 208 of the LSA.

b. If the aggregate metric is greater than the threshold value then it discards the LSA and the normal OSPF procedures are followed as standard. However, the node has to acknowledge receipt of this LSA before discarding to prevent any further transmission of this LSA by its neighbours.

The LSAs forwarded by router 14A which originated outside of router 14A (i.e. LSA1, LSA2, LSA3) fail the test as their aggregate metric value exceeds the threshold value, but LSA4 and LSA5 pass the test, since the links they relate to are only one 'hop' away. In this simple example, each link metric is =1 and the threshold limit R=2. Router 14A performs shortest path first (SPF) calculations when it has received a suitable set of LSAs from neighbouring nodes. In performing these calculations, it finds that the links advertised by LSA1 and LSA2 are actually within the threshold limit. As a result, LSA1 and LSA2 are advertised to node 14B in a LS update message 209. As before, upon receiving the LS Update message 209 router 14B checks whether the new LSAs fall within the threshold limit. LSA1 passes the test, is installed in router 14B's database and is advertised to neighbouring nodes in an update message 212. In the final stages 207, 209 any LSAs whose aggregate-metric as calculated by the SPF algorithm remains at or above the radius limit would not be reflooded (at step 209), and may optionally, if the aggregate-metric is above the radius limit, be purged from the database 220 of router 14A.

Figure 9:
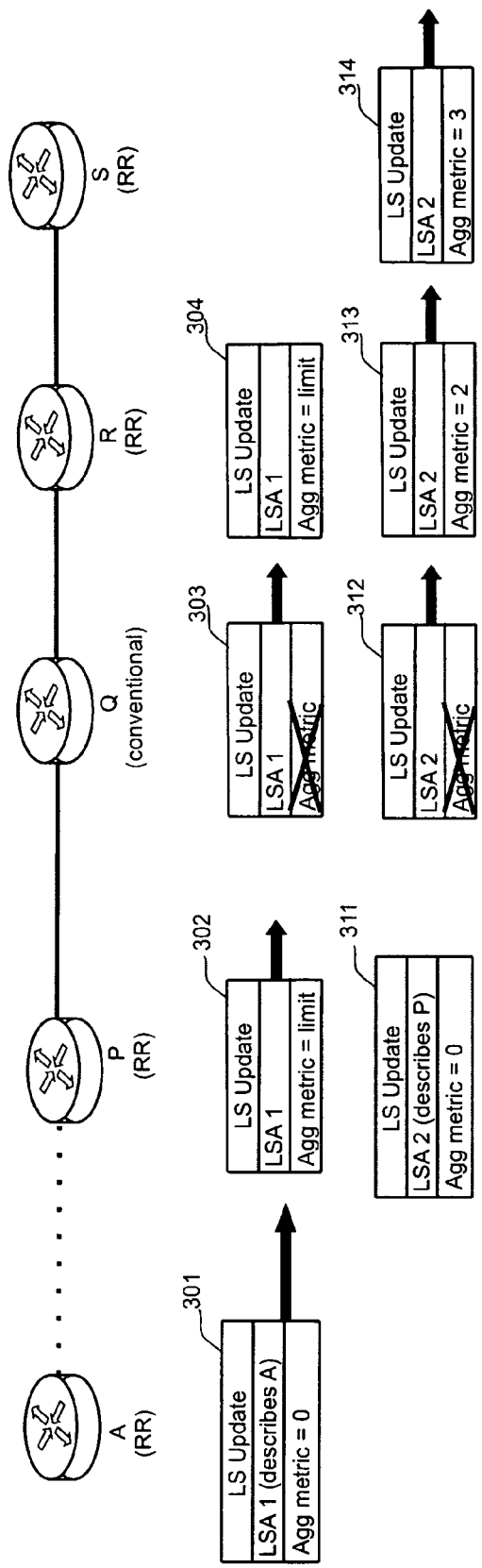
FIG. 9 shows a further example topology and interworking between routers.

In the worked example above, LSAs from conventional routers are effectively 'poisoned' at their point of entry to a radius-restricted part of the network by setting the aggregate metric equal to the threshold value. Subsequently, the LSAs are propagated if they are considered to have travelled along a path whose aggregate distance (cost) is less than the allowable threshold value. This is particularly of value where the network topology is more complicated than that shown in FIG. 7. FIG. 9 shows a further example where the mix of conventional and radius-restricted (RR) routers is more varied. An LSA message 301 originates at node A with an aggregate metric having an initial value of zero. This propagates through the network to a subsequent node P, some way downstream of node A, where the aggregate metric has reached the threshold limit. LSA is forwarded as an LS Update 302 by node P and, in a standard radius-restricted network, the neighbouring node would prevent the LSA from travelling any further. However, because the neighbouring node Q is a conventional router (which would not recognise the metric field) the metric is stripped from the LSA before it is passed to node Q.

Router R receives the LS Update and adds an aggregate metric field equal to the threshold value. Subsequently, router R runs SPF calculations and this confirms that LSA1 originated at a node which exceeds the threshold metric value. In addition, node P originates an LSA2 311 describing a link at node P. This passes through node Q without a metric field 312 and node R initially assigns the LSA an aggregate metric equal to the maximum value. After SPF calculations, node R determines that LSA2 is actually at a distance of 2 and advertises the link to router S in a LS Update message 313 with the aggregate metric equal to the correct value. This allows node S to install the LSA and to advertise it 314 to other nodes.

The processes described above should also be applied during database synchronisation between nodes to avoid problems with the synchronisation process.

Figure 10:
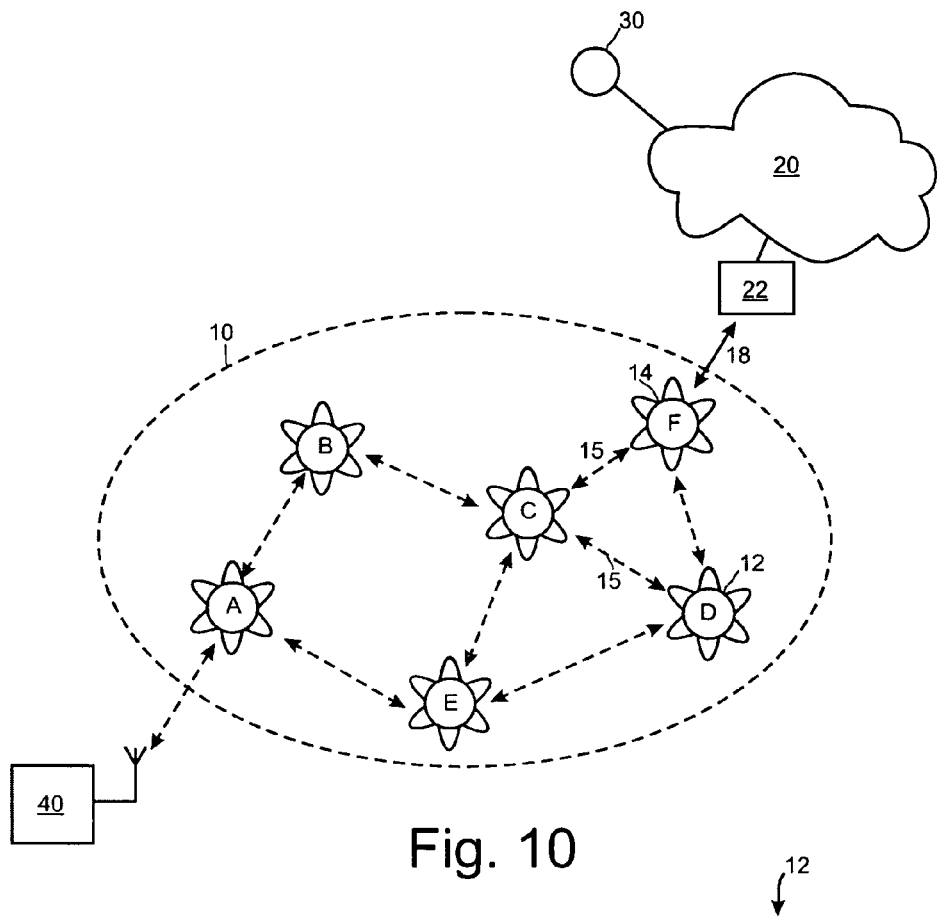
FIG. 10 shows an example communications network in which the invention can be applied.

It will be appreciated that the invention described herein can be applied to many types of network and FIG. 10 shows one example of a communication network in which the invention may be applied. Some networks are arranged such that traffic is focussed towards a particular node in the network. This node, which will be called a focal node, may provide access to a backbone network. Most, or all, traffic within the network will pass to or from the focal node. In FIG. 10 a focal node 14 is connected by communication links 15 to other nodes 12 within domain 10. The nodes 12 are connected to each other by links 15 to form a mesh within domain 10, although the invention is not limited to a mesh topology. The focal node 14 is connected by relatively higher bandwidth resources 18, such as a wired link, to a packet gateway 22. The packet gateway 22 is connected to a high speed communication resource 20 such as the Internet or Public Switched Telephone Network (PSTN). Many such domains 15 can be provided in the same manner, each having a similar focal node 14 and a set of nodes 10. Traffic can be routed from one domain 10 to another via the network 20, or to remote servers 30 also connected to network 20. Focal node F may be considered a node within the domain 10 or may be considered a node on the border of the domain 10, as shown. In the example illustrated in FIG. 10, there is one focal node in domain 10, although the invention is not limited to this particular example. Referring back to FIG. 1, the radius R that LSAs propagate can be fixed in advance at a value that is intended to be sufficient to enable the link state advertisements to reach the focal node (and conversely for the link state advertisements to reach the nodes). If the network has a plurality of focal nodes, then the value of R should preferably be chosen so that LSAs can reach at least two of the focal nodes.

The nodes 12 in the domain 10 may communicate between each other using one wireless technology and may communicate with end users, such as a wireless terminal 40, using another wireless technology. These wireless technologies may be distinguished by frequency or protocol. In one implementation, the wireless technologies are IEEE 802.11a and IEE 802.11b although one of the IEEE 802.16x protocols, the Universal Mobile Telecommunication System (UMTS) wireless communications protocol, the IEEE 802.11a wireless communication protocol, IEEE 802.11g standard, HiperLAN, Bluetooth. or other emerging protocols such as IEEE 802.18 could also be used. The user terminal 40 can be a mobile telephone, a data terminal such as a laptop or personal digital assistant (PDA) or any other kind of communications device.

Figure 11:
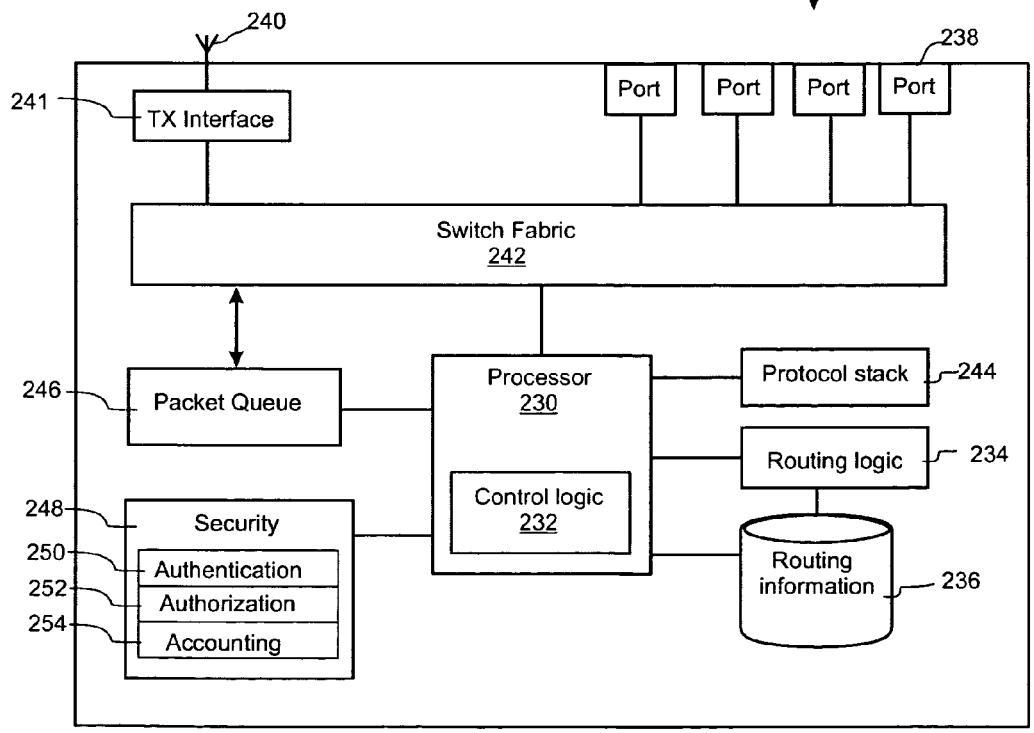
FIG. 11 shows a block diagram of the functions within a node of the network of FIGS. 1 and 10.

FIG. 11 is a functional block diagram of a node configured to implement an embodiment of the invention. The node 12 generally includes a processor 230 containing control logic 232 configured to perform functions described to enable the node to perform routing. The processor 230 may interface routing software 134 and routing tables 236 to enable it to perform the functions described above. The network element may be provided with one or more components (hardware and/or software) to enable it to communicate on a communication network. The node includes a plurality of network ports 238 as well as a transmission interface 241 and antenna 240 to enable the node to communicate using both wireline and wireless technologies. The various interfaces (wireless and wireline) are connected to a switch fabric 242 that operates under the control of the processor 230. A protocol stack 244 containing data and instructions configured to enable the node to participate in protocol exchanges on the network may optionally be included. Other conventional network element features, such as a packet queue 246 configured to temporarily store protocol data units for transmission on the network, may also be included. Additionally, the node may include a security module 148 containing an authentication module 250 configured to authenticate users, devices, or connections on the network, an authorization module 252 configured to determine appropriate authorization control information to prevent unauthorized access to the network, and an accounting module 254 configured to enable accounting entries to be established for communication sessions on the network. Other modules may be included as well and the invention is not limited to a particular implementation of the network device.

The functions described above may be implemented as a set of program instructions that are stored in a computer readable memory within the network element and executed on one or more processors within the network element. However, it will be apparent to a skilled person that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

The invention is not limited to the embodiments described herein, which may be modified or varied without departing from the scope of the invention.

We claim:

1. A method of operating a node within a communication network, the network comprising a plurality of nodes interconnected by communication links, the nodes being of a radius-restricted type, which support dissemination of topology information for a restricted distance within the network, and of a non radius-restricted type, which do not support the propagation of topology information for a restricted distance within the network, the method comprising:
    receiving a topology advertisement from another node of the network which provides information about a part of the network;
    determining if the topology advertisement was sent by a node which supports radius-restricted dissemination of topology information;
    selecting a mode of operation to interwork with said another node dependent on the determination, the node being operable in:
    a radius-restricted mode, in which the node includes a metric indicative of the aggregate path travelled by a topology advertisement when interacting with said another node; or
    a non radius-restricted mode, in which the node does not include a metric indicative of the aggregate path travelled by a topology advertisement when interacting with said another node.

2. A method according to claim 1 wherein the topology advertisement is a link state advertisement.

3. A method according to claim 1 wherein the determining step inspects the length of a header of the received topology advertisement to determine whether the header includes an additional field carrying radius-restricted topology information.

4. A method according to claim 1 wherein the determining step comprises:
   inspecting a metric within the received topology advertisement representing the path travelled by that topology advertisement;
   determining whether the topology advertisement originated at the neighbouring node;
   and wherein if the metric is zero and the topology advertisement did not originate at the neighbouring node, selecting the non radius-restricted mode of operation.

5. A method according to claim 1 wherein the determining step comprises performing a checksum calculation on the received topology advertisement, using a checksum algorithm known to radius-restricted nodes, and comparing the result with a checksum value carried within the received topology advertisement and selecting the non radius-restricted mode of operation if the result does not equal the checksum value carried within the topology advertisement.

6. A method according to claim 5 further comprising performing a further checksum calculation using a conventional checksum algorithm, comparing the result with a checksum value carried within the received topology advertisement, and selecting the non radius-restricted mode of operation if the result equals the checksum value carried within the topology advertisement.

7. A method according to claim 1 further comprising forwarding a topology advertisement received from said another node to another radius-restricted node with the metric set at a value which will prevent that node from installing the topology advertisement.

8. A method according to claim 7 further comprising performing a calculation to determine an actual path length between the node and a node which originated a received topology advertisement, comparing the calculated path with a radius threshold and, if the calculated shortest path is less than the threshold, forwarding that topology advertisement to another node.

9. A method according to claim 8 wherein the calculation is a shortest path first (SPF) calculation.

10. A method according to claim 8 wherein the calculation is based on topology information received in a plurality of topology advertisements.

11. A node for use as part of a communication network, the network comprising a plurality of nodes interconnected by communication links, the nodes being of a radius-restricted type, which support dissemination of topology information for a restricted distance within the network, and of a non radius-restricted type, which do not support the propagation of topology information for a restricted distance within the network, the node comprising control logic which is operable to:
   receive a topology advertisement from another node of the network which provides information about a part of the network;
   determine if the topology advertisement was sent by a node which supports radius-restricted dissemination of topology information;
   selecting a mode of operation to interwork with said another node dependent on the determination, the node being operable in:
   a radius-restricted mode, in which the node includes a metric indicative of the aggregate path travel led by a topology advertisement when interacting with said another node; or
   a non radius-restricted mode, in which the node does not include a metric indicative of the aggregate path travelled by a topology advertisement when interacting with said another node.

12. A communication network including at least one node according to claim 11.

13. A machine readable medium encoded with instructions for controlling a node of a communication network, the network comprising a plurality of nodes interconnected by communication links, the nodes being of a radius-restricted type, which support dissemination of topology information for a restricted distance within the network, and of a non radius-restricted type, which do not support the propagation of topology information for a restricted distance within the network, the instructions causing the node to:
   receive a topology advertisement from another node of the network which provides information about a pad of the network;
   determine if the topology advertisement was sent by a node which supports radius-restricted dissemination of topology information;
   selecting a mode of operation to interwork with said another node dependent on the determination, the node being operable in:
   a radius-restricted mode, in which the node includes a metric indicative of the aggregate path travelled by a topology advertisement when interacting with said another node; or
   a non radius-restricted mode, in which the node does not include a metric indicative of the aggregate path travelled by a topology advertisement when interacting with said another node.

14. A method of operating a node within a communication network, the network comprising a plurality of nodes interconnected by communication links, the nodes being of a radius-restricted type, which support propagation of topology information for a restricted distance within the network, and of a non radius-restricted type, which do not support the propagation of topology information for a restricted distance within the network, the method comprising:
   receiving a topology advertisement from a non radius-restricted node which provides information about a pad of the network;
   forwarding the topology advertisement to a radius-restricted node with a metric indicative of the aggregate path travelled by the topology advertisement, the metric being set at a value which will prevent the radius-restricted node from installing the topology advertisement.

15. A method according to claim 14 wherein the metric is set at, or above, the threshold value that a node requires to accept a topology advertisement.

16. A method according to claim 14 further comprising performing a calculation to determine an actual path length between the node and a node which originated a received topology advertisement, comparing the calculated path with a radius threshold and, if the calculated shortest path is less than the threshold, forwarding the topology advertisement to the radius-restricted node.

17. A method according to claim 16 wherein the calculation is a shortest path first (SPF) calculation.

18. A method according to claim 16 wherein the calculation is based on topology information received in a plurality of topology advertisements.

19. A method according to claim 14 further comprising performing a checksum calculation on the received topology advertisement using a checksum algorithm known to radius-restricted nodes, and storing the checksum within the topology advertisement before forwarding the topology advertisement to another radius-restricted node.

20. A node for use as part of a communication network, the network comprising a plurality of nodes interconnected by communication links, the nodes being of a radius-restricted type, which support propagation of topology information for a restricted distance within the network, and of a non radius-restricted type, which do not support the propagation of topology information for a restricted distance within the network, the node comprising control logic which is operable to:

receive a topology advertisement from a non radius-restricted node which provides information about a part of the network;

forward the topology advertisement to a radius-restricted node with a metric indicative of the aggregate path travelled by the topology advertisement, the metric being set at a value which will prevent the radius-restricted node from installing the topology advertisement.

21. A communication network including at least one node according to claim 20.

22. A machine readable medium encoded with instructions for controlling a node of a communication network, the network comprising a plurality of nodes interconnected by communication links, the nodes being of a radius-restricted type, which support propagation of topology information for a restricted distance within the network, and of a non radius-restricted type, which do not support the propagation of topology information for a restricted distance within the network, the instructions causing the node to:

receive a topology advertisement from a non radius-restricted node which provides information about a part of the network;

forward the topology advertisement to a radius-restricted node with a metric indicative of the aggregate path travelled by the topology advertisement, the metric being set at a value which will prevent the radius-restricted node from installing the topology advertisement.

\* \* \* \* \*